United States Patent [19]

Pennisi et al.

[11] Patent Number: 5,439,622
[45] Date of Patent: Aug. 8, 1995

[54] METHOD AND APPARATUS FOR PRODUCING MOLDED PARTS

[75] Inventors: Robert W. Pennisi, Boca Raton; Glenn W. Urbish, Coral Springs, both of Fla.

[73] Assignee: Motorola, Inc., Schaumburg, Ill.

[21] Appl. No.: 116,632

[22] Filed: Sep. 7, 1993

[51] Int. Cl.⁶ ........................ B29C 33/48; B29C 33/56
[52] U.S. Cl. ........................ 264/22; 249/111; 249/127; 264/129; 264/219; 264/338; 425/174.4; 425/175; 425/417; 425/DIG. 14
[58] Field of Search ........... 264/22, 338, 219, 129, 264/220, 226, 221, 224, 225, 227; 425/174.4, 175, 440, 389, 405.1, 417, DIG. 19, DIG. 14; 249/111, 117, 127

[56] References Cited

U.S. PATENT DOCUMENTS

| | | | |
|---|---|---|---|
| 3,248,758 | 5/1966 | Schmitz et al. | 264/219 |
| 3,424,635 | 1/1969 | Grandinetti et al. | 264/220 |
| 3,594,877 | 7/1971 | Suda et al. | 425/440 |
| 3,723,584 | 3/1973 | Nussbaum | 264/219 |
| 3,883,627 | 5/1975 | Fitts | 264/220 |
| 3,989,790 | 11/1976 | Bruner et al. | 264/220 |
| 4,028,455 | 6/1977 | Ueda et al. | 264/220 |
| 4,201,289 | 5/1980 | Mack et al. | 249/117 |
| 4,285,901 | 8/1981 | Votsutsuji et al. | 264/220 |
| 4,334,850 | 6/1982 | Gerabedian | 425/389 |
| 4,536,364 | 8/1985 | Lindskog | 264/227 |
| 4,671,837 | 6/1987 | Stewart | 264/219 |
| 4,749,347 | 6/1988 | Valavaara | 264/219 |
| 4,844,144 | 7/1989 | Murphy et al. | 425/174.4 |
| 4,873,044 | 10/1989 | Epel | 425/389 |
| 4,929,403 | 5/1990 | Audsley | 264/225 |
| 5,087,193 | 2/1992 | Herbert, Jr. | 425/389 |
| 5,151,232 | 9/1992 | Thornwaite et al. | 264/220 |
| 5,178,673 | 1/1993 | Caster et al. | 264/221 |
| 5,260,014 | 11/1993 | Holton et al. | 264/225 |
| 5,362,429 | 11/1994 | Orlewicz et al. | 264/221 |

FOREIGN PATENT DOCUMENTS 0491650  6/1992  European Pat. Off. ............ 425/440

OTHER PUBLICATIONS

Design News, Prototyping, Jun. 25, 1990, article "Quick Path to Protype Tooling".
Prototech Engineering, Inc., Article "Spray Metal Tooling", No Date.
Custom Molded Cavities/3M Pamphlet, No Date.
Hobart Tafa Technologies, Bulletin No. 300-D10622, No Date.

Primary Examiner—Jay H. Woo
Assistant Examiner—Duane S. Smith
Attorney, Agent, or Firm—Andrew S. Fuller

[57] ABSTRACT

A mold (100) is constructed by forming a shell (125) having a back surface (127) and a mold surface (126) which defines a mold cavity (150), by forming a shell base (124) about the back surface (127) of the shell (125) so as to define an enclosed cavity (134) between the shell base (124) and the shell (125), and by filling the enclosed cavity (134) with substantially incompressible material (135).

15 Claims, 4 Drawing Sheets

METHOD AND APPARATUS FOR PRODUCING MOLDED PARTS

TECHNICAL FIELD

This invention relates in general to molds, and in particular, to molds suitable for use in low volume applications.

BACKGROUND

Prototyping is often used during product development to verify design concepts and to facilitate advance testing. A prototype must have characteristics sufficiently close to the desired product to permit a realistic prediction of actual product performance. Prototyping molded parts can be expensive both in capital outlay and in development time. Production quality molded parts are generally produced using metal mold manufacturing. A metal mold is expensive to produce and can require a long lead time, as time must be allocated for designing the mold, machining the mold cavity, texturing the surface of the mold cavity, and the like. When the number of design iterations is considered along with the relatively small prototype volumes and high cost of metal mold development, it is clear that metal mold manufacturing is not well-suited for many prototyping applications. Similarly, metal mold manufacturing would not be suited for short cycle time, low volume production runs. Alternatives more suitable for prototyping and low volume production have been explored. These alternatives include room temperature vulcanization (RTV) molds, and spray metal molds.

A typical RTV design involves forming a mold from a pliable material, usually urethane, silicone, or similar elastomeric resin which can be cured at or near room temperature. First, a model of the part, often called a master, is formed using a stereolithography apparatus (SLA) process, or other suitable technique. Typically, the master is designed using a computer aided design (CAD) system which can generate data needed to construct the master. This CAD data is used by the SLA process which uses a laser to cure a photopolymerizable resin to produce a solid three-dimensional object. Although an SLA master is suitable for cosmetic analysis of the part, such as fit and form, and for some analysis of functionality, the SLA master may not be suitable for full mechanical testing. The materials currently adaptable to the SLA process usually have unacceptable mechanical properties for many applications, such as the inability to withstand high mechanical stresses. Next, the part is encapsulated with a material suitable for use in a RTV process. The material is then cured to form a RTV mold in which duplicates of the master are cast from a urethane, epoxy, or similar resin, which cross links at temperatures at or near room temperature. RTV molds can support materials which have properties, such as impact strength, that are better than the materials which can be used to produce the SLA master. However, parts cast in RTV molds lack the stiffness, impact and temperature performance, and other mechanical properties obtainable from injection molded plastics, such as polycarbonates and the like, which are typically used in production quality parts. Thus, a part produced using a RTV mold does not provide an adequate representation of the final product for true mechanical testing and product evaluation.

Spray metal molds also require a master. A spray metal mold is formed by an application of metal spray to the master which forms a hardened shell which assumes the shape of the part. The shell is reinforced with a support base before being used as a mold. A spray metal mold can support a wider variety of materials than a RTV mold. However, a spray metal mold for a part having intricate details may have multiple segments, called inserts, to accommodate oddly shaped features of the part. As the level of detail increases, the cost and lead time required for a spray metal mold may approach the cost and lead time of a conventional prototype metal mold.

Manufacturers are continuously seeking reductions in the length and cost of the product development cycle. Rapid prototyping and low volume production are useful tools in this effort. Current techniques for prototyping molded parts are costly and inadequate for many applications. Hence, there is a need for a more expeditious and cost effective process for producing molds.

SUMMARY OF THE INVENTION

Briefly, according to the invention, a method for constructing a mold is disclosed. The mold is constructed by forming a shell having a back surface and a mold surface defining a mold cavity, by forming a shell base about the back surface of the shell so as to define an enclosed cavity between the shell base and the shell, and by filling the enclosed cavity with a substantially incompressible material. Additionally, according to the invention, a mold includes a polymeric shell defining a mold cavity, a shell base about the shell, an enclosed cavity between the shell base and the shell, and a substantially incompressible material located within the enclosed cavity.

DETAILED DESCRIPTION OF THE PREFERRED EMBODIMENT

Figure 1:
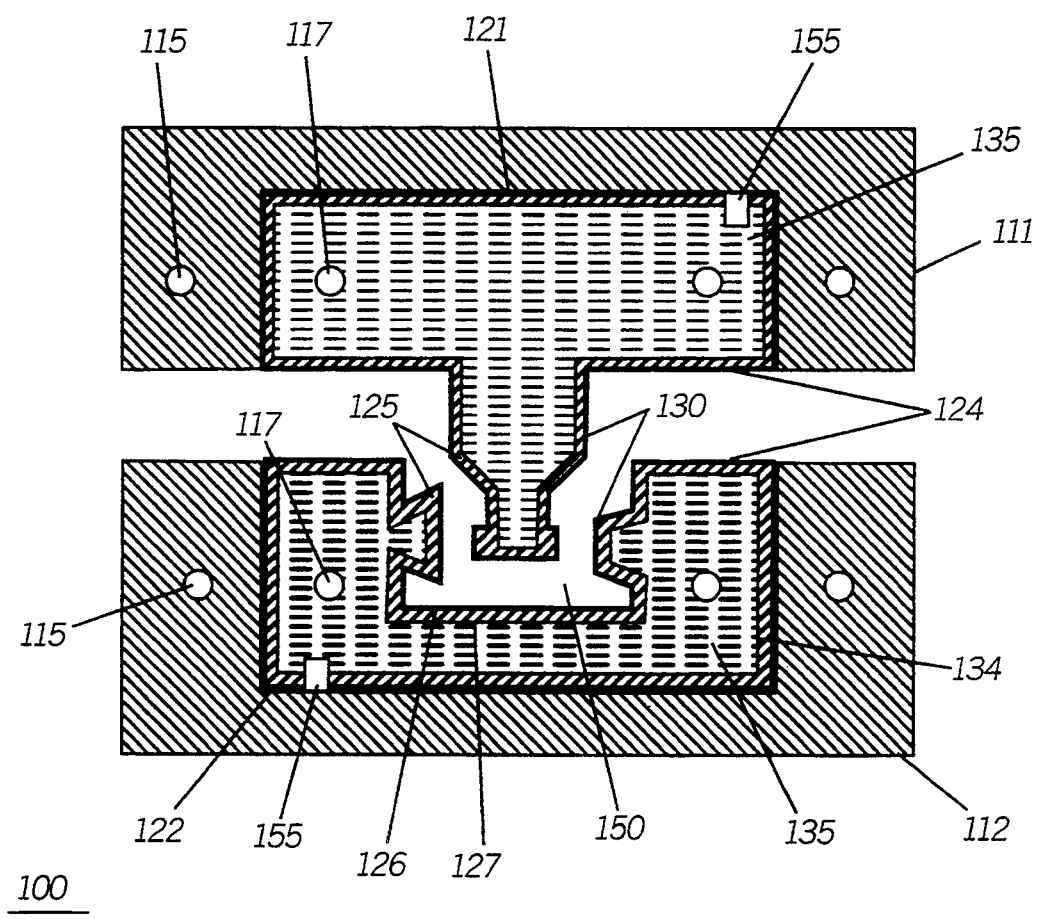
FIG. 1 shows a cross-sectional view of a mold and apparatus for producing a molded part in accordance with the present invention.

Referring to FIG. 1, a mold 100 for producing a molded part is shown in accordance with the present invention. The mold 100 includes first and second mold portions 121, 122, and first and second mold supports 111, 112, for housing the mold portions 121, 122 respectively. The mold support 111, 112 are formed from steel or other material capable of withstanding the mechanical stresses of the molding process.

The mold portions combine to form a mold cavity 150 into which mold material is introduced to form the molded part, and thus, the shape of the mold cavity 150 determines the shape of the molded part. Each mold portion includes a shell 125 having the shape of an outline of the part, a shell base 124 which supports the shell 125, and an incompressible material 135 within a cavity 134 between the shell base 124 and the shell 125. To avoid confusion, this description uses the term "shell base" to refer the backing for the shell 125, and "mold support" to refer to the housing for the mold portions 121, 122. The term "mold base" might be used in the art as a synonym for mold support. It is entirely consistent with the invention to have a configuration in which there is no distinction between the shell base 124 and the mold support 111, 112.

Constructing the mold 100 includes forming the shell 125 to have a mold surface 126 defining the shape of the mold cavity 150, and a back surface 127 opposite the mold surface. The shell 125 is formed from a material such as acrylic based elastomers of urethanes, silicones, epoxy, low temperature photocurable resins, or any other suitable mold material. The shell 125 can be constructed in a variety of ways. In the preferred embodiment, the shell 150 is formed from a resinous material using stereolithography. The resulting shell 125, which is approximately 0.5–1.5 millimeters thick, has some degree of resilience and resumes its shape after temporary deformation. The data needed for the stereolithography process can be derived from information available on the part. For example, in the preferred embodiment, the part is designed using a computer aided design (CAD) system, and corresponding information relating to the outline of the part is derivable from the CAD system and is used to design the mold 100. Alternatively, the shell 125 can be built using an RTV process to create an impression from a model of the part, using silicone or other suitable material. Thus, the RTV process requires the prior construction of the model.

The shell base 124 is formed about the shell 125 and helps to provide structural support for the shell 125. Preferably, the shell base 124 is integrally formed with the shell 125 using stereolithography by extending the shell 125 material to form the shell base 124. The shell base 124 can be built separately, however, and can be constructed from a different material than the shell 125. If constructed separately, the shell base 124 would be mated to the shell 125 to provide the necessary support. The shell base 124 and the shell 125 are mated so that a substantially enclosed cavity 134 exists between the shell base 124 and the shell 125.

The enclosed cavity 134 is filled with incompressible material 135 thereby forming a substantially rigid mold 100 which can withstand the compressive forces associated with an injection molding process. Possible choices for the incompressible material 135 include high packing density ceramic particles such as silica, alumina, or aluminum nitride. Other possibilities include liquids such as water or oil. The enclosed cavity is accessible through an opening in the shell base 124 and is sealed by a sealing mechanism such as a plug 155, to retain the incompressible material 135 within the enclosed cavity 134.

Figure 2:
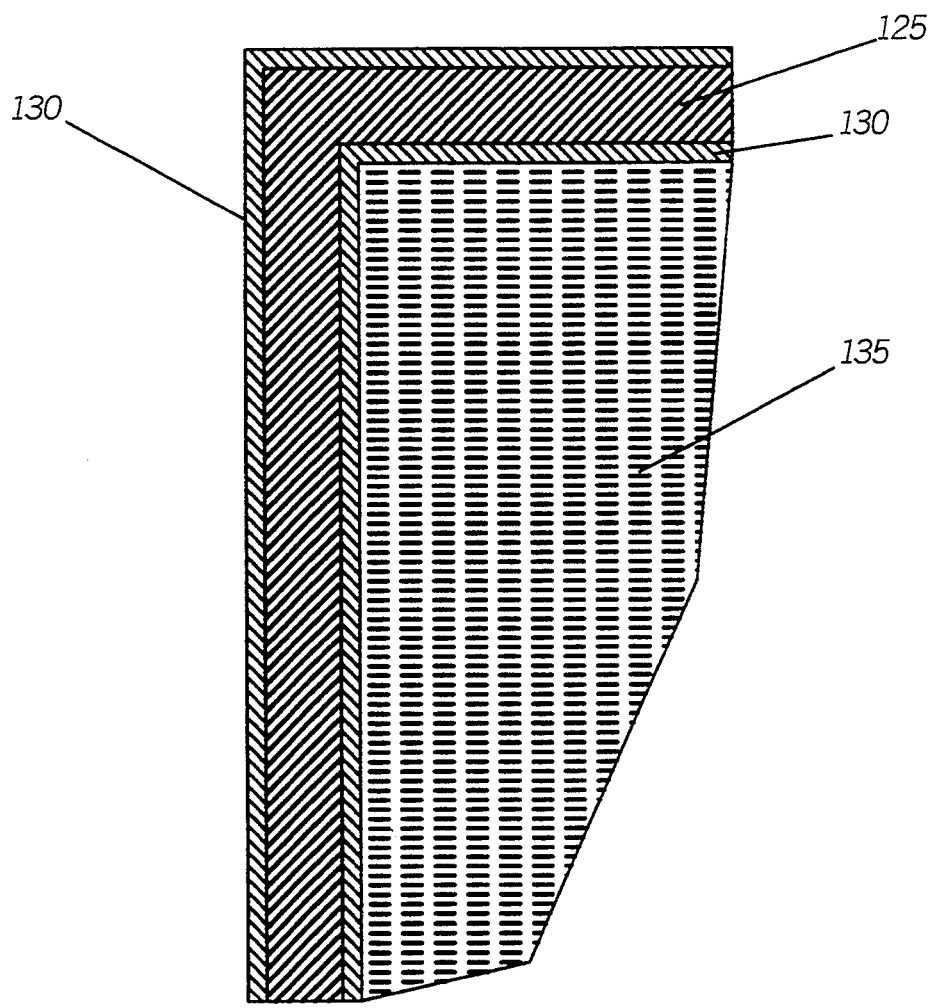
FIG. 2 is an enlargement of a portion of the mold of FIG. 1.

To enhance performance of the mold 100, the shell 125 is coated with a thermally conductive material 130 such as copper or the like. FIG. 2 shows an enlargement of the shell 125 to highlight the application of the conductive material coating 130. As depicted, the shell 125 has both an inner and outer coating 130. Referring back to FIG. 1, the coating may be applied to the interior and exterior surfaces of both the shell base 124 and the shell 125. Preferably, the coating is done using electroless plating techniques, or any low temperature deposition process, in which thermally conductive particles, such as metal or ceramic particles, are deposited on the surface of the material to be coated. In the preferred embodiment, electroless plating is used to build a layer of metal of approximately 1–2 microns thick. Alternatively, the metallic coating could be accomplished using ion sputtering techniques. The metal coat 130 helps to dissipate heat which aids in accelerating the molding process, and also helps to seal the porous surface of the mold cavity 150 to produce a smoother textured mold surface. For additional heat dissipation, cooling lines 117, 115 are located within the body of the mold 100 and the mold supports 111, 112, to help to transfer heat away from the surface of the mold cavity 150.

Figure 3:
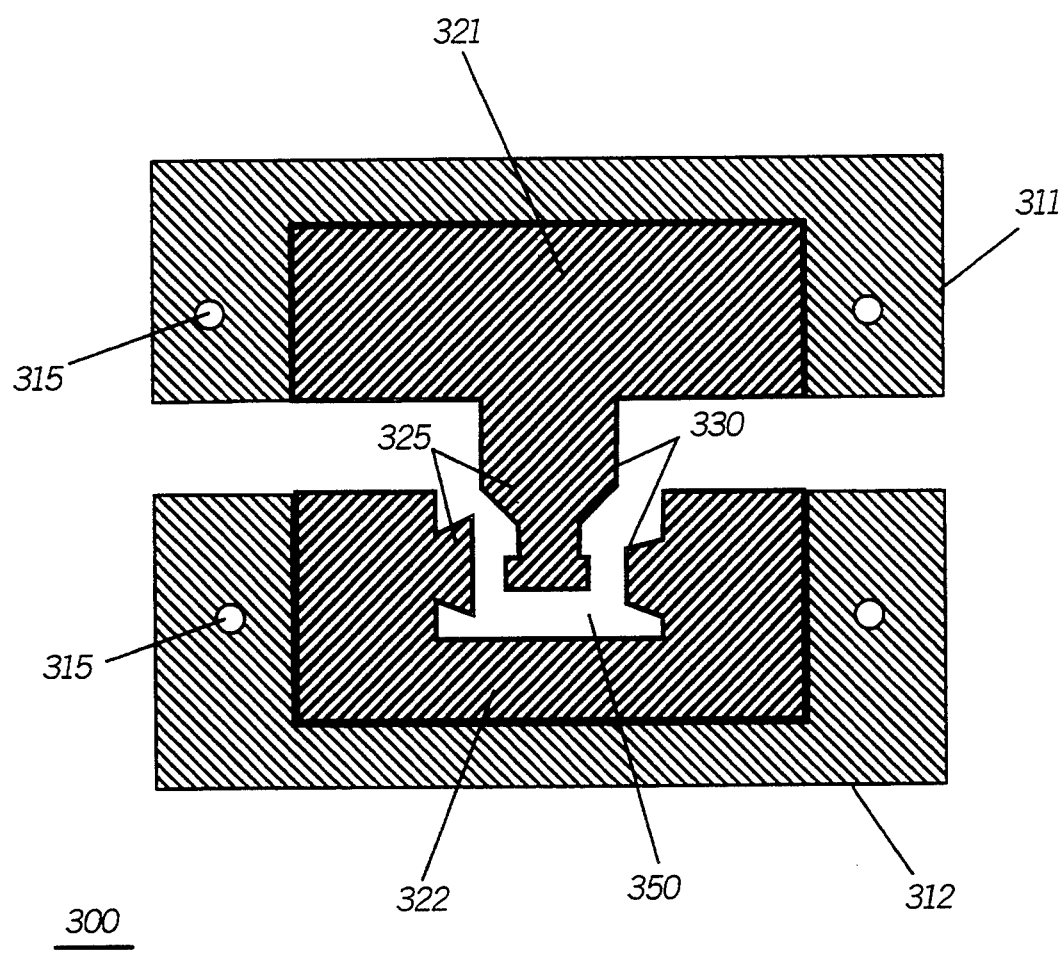
FIG. 3 shows a cross-sectional view of a second embodiment of the mold and apparatus for producing a molded part, in accordance with the present invention.

Referring to FIG. 3, a second embodiment of the mold 300 for producing a molded part is shown, in accordance with the present invention. The mold 300 includes first and second mold inserts 321, 322, which combine to form a mold cavity 350, and first and second mold supports 311, 312, for housing the mold inserts 321, 322 respectively. The mold inserts 321, 322 are formed from a resinous material using stereolithography, and are coated with a thermally conductive material 330 to aid in transferring heat from the mold cavity 350. The mold inserts 321, 322 are then placed into the mold supports 311, 312. Cooling lines 315 are included within the mold supports 311, 312 to further aid in heat dissipation.

Figure 4:
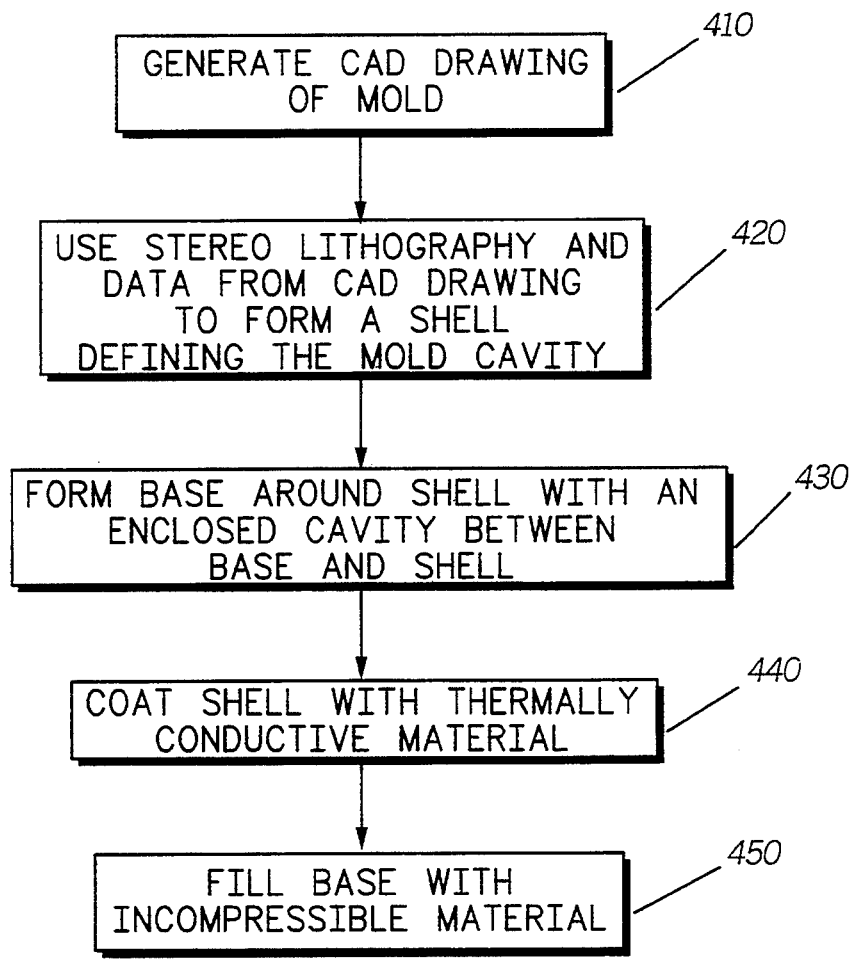
FIG. 4 is a flow diagram of the process of making a mold in accordance with the present invention.
Figure 5:
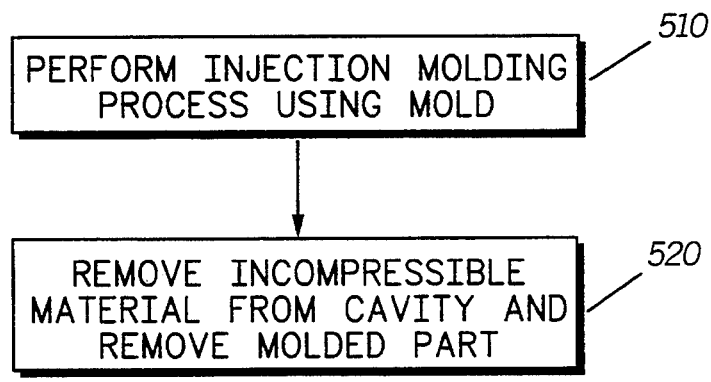
FIG. 5 is a flow diagram of the process of making a molded part using the mold produced using the process of FIG. 4, in accordance with the present invention.

FIG. 4 shows a flow diagram which summarizes the process of constructing a mold in accordance with the present invention. A CAD tool is used to generate data for the mold, step 410. The data is fed to a stereolithographic process to form the shell defining the mold cavity, step 420. The shell base is formed around the shell and the enclosed cavity is created, step 430. The shell is coated with thermally conductive material, step 440. Steps 420 and 430 may occur simultaneously. Next, the shell base is filled with incompressible material, step 450. Referring to FIG. 5, the mold formed by the process of FIG. 4 is used to produce a molded part. Injection molding or other molding techniques is used to place the part material within the mold cavity and the molding process is performed, step 510. Prior to the removal of the part from the mold, some or all of the incompressible material is removed from the enclosed cavity to make the mold more flexible thereby facilitating separation of the part from the mold, step 520.

Referring back to FIG. 1, significant advantages can be realized from a mold 100 constructed in accordance with the present. The combination of the thermally coated shell 125 and the support provided by the incompressible material 135, the mold 100 can withstand significant thermal and mechanical stresses which may be encountered during the molding process. Thus, depending on the application, the mold 100 is capable of producing production quality parts. Moreover, the direct application of stereolithography techniques to produce the mold 100 can result in substantial savings in development time and costs. Furthermore, when compared to methods currently used to produce prototype parts in a short turnaround time, such as the use of a stereolithography process or a RTV process, the mold 100, according to the invention, will produce a part having better mechanical properties than these processes. A prototype part thus produce is more suitable for testing, and can provide a more accurate evaluation of expected part performance.

What is claimed is:

1. A method of constructing a mold, comprising the steps of:

directly applying stereolithography to form a shell having a back surface and a mold surface;

directly applying stereolithography to form a shell base integral to the shell by extending the shell to define an enclosed cavity about the back surface of the shell;

filling the enclosed cavity with a substantially incompressible material.

2. A method of constructing a mold as defined in claim 1, wherein said shell forming step comprises:

fabricating the shell from a polymeric material.

3. A method of constructing a mold as defined in claim 2, further comprising the step of:

coating the shell with thermally conductive material.

4. A method of constructing a mold as defined in claim 3, wherein said coating step comprises:

depositing metal on the shell.

5. A method of constructing a mold as defined in claim 4, wherein said coating step comprises:

plating the shell using electroless plating techniques.

6. A method of constructing a mold as defined in claim 5, wherein said coating step comprises:

depositing metal particles on the shell using ion sputtering techniques.

7. A method of constructing a mold, comprising the steps of:

forming an integral shell and shell base by direct application of stereolithography, such that the shell has a back surface and a mold surface, and such that the back surface and shell base define a substantially enclosed cavity;

coating the shell with thermally conductive material; and filling the enclosed cavity with an incompressible material.

8. A method of constructing a mold, comprising the steps of:

utilizing stereolithography to directly form at least a portion of a mold insert for producing molded parts; and placing the mold insert within a mold support.

9. A method of constructing a mold, comprising the steps of:

utilizing stereolithography to directly form a shell having a mold surface, which defines a mold cavity, and a back surface;

forming a shell base about the back surface of the shell so as to define an enclosed cavity between the shell base and the shell; and filling the enclosed cavity with a material to form a substantially rigid mold.

10. A method of constructing a molded part, comprising the steps of:

applying stereolithography to directly form a shell having a mold surface, which defines a mold cavity, and a back surface;

forming a shell base about the back surface of the shell so as to define an enclosed cavity between the shell base and the shell;

filling the enclosed cavity with an incompressible material;

placing product material within the mold cavity and performing a molding process; and removing at least some of the incompressible material from within the enclosed cavity to facilitate removal of the molded part from the mold cavity.

11. A mold, comprising:

a polymeric shell having a first portion defining a mold cavity;

the shell having a second portion extending to form a shell base about said shell, the shell base and shell defining a substantially enclosed cavity, the enclosed cavity having a sealable access opening, wherein said shell has a thermally conductive material coating; and a substantially incompressible material located within said enclosed cavity, and being removable from the enclosed cavity through the access opening.

12. A mold as defined in claim 11, wherein said shell comprises a stereolithographed portion.

13. A mold as defined in claim 11, wherein said incompressible material is selectively removable from said enclosed cavity to make said shell flexible.

14. A method of forming a mold, comprising the steps of:

directly applying stereolithography to form a flexible shell which defines a mold surface, and to form a shell base so as to define an enclosed cavity between the shell and shell base;

introducing an incompressible material within the enclosed cavity, the incompressible material being selectively removable to vary flexibility of the shell.

15. The method of claim 14, further comprising the step of coating the shell with thermally conductive material.

* * * * *